Sept. 2, 1930.  K. KILCHLING  1,774,516
TORSION BALANCE FOR GRAVITATIONAL MEASUREMENTS
Filed March 13, 1925
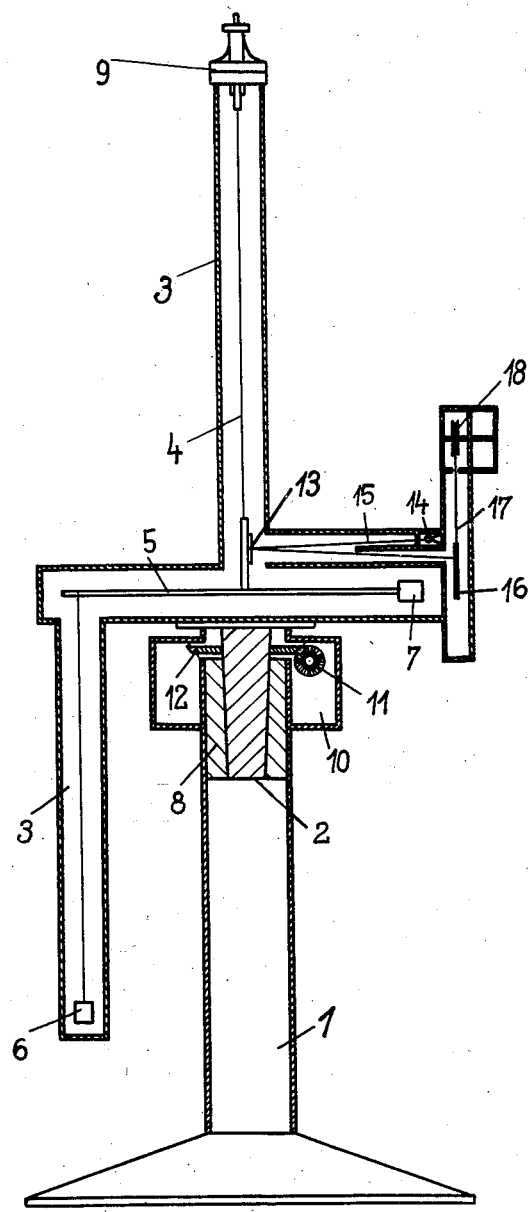
Inventor:
Karl Kilchling
by / Attorney Patented Sept. 2, 1930

1,774,516

UNITED STATES PATENT OFFICE

KARL KILCHLING, OF FREIBURG-IM-BREISGAU, GERMANY

TORSION BALANCE FOR GRAVITATIONAL MEASUREMENTS

Application filed March 13, 1925, Serial No. 15,279½, and in Germany March 24, 1924.

The method of Eötvös for determining gravity variations is based upon the following equation:

$$\vartheta = \frac{n-n_o}{2D} = \frac{I}{2} \cdot \frac{K}{\tau}(b-a) \cdot \sin 2\alpha + \frac{K}{\tau} \cdot c \cdot \cos 2\alpha - \frac{m.h.l}{\tau} \cdot G_x \sin \alpha + \frac{m.h.l}{\tau} \cdot G_y \cdot \cos \alpha$$

In this equation K means the moment of inertia, $h$ the difference of height of the two attraction masses $m$, $l$ the length of the turning arms of the scale-beam, and $\tau$ the torsion constant of the torsion wire, from which the suspension members are suspended. These quantities are constants of the torsion scale; they are ascertained once for all after known methods.

$\alpha$ denotes the azimuth of the turning arm with the more deeply suspended weight, reckoned from the north over the east. In every azimuth the torsion angle $\theta$ of the suspension members is measured relatively to the zero position, viz: in graduation parts $n$, $n_o$ is the zero position of the non-twisted wire, and D is the distance between the graduated scale and the mirror.

The equation contains, besides, the four unknown quantities $$b-a = \frac{\delta^2 U}{\delta_y^2} - \frac{\delta^2 U}{\delta_x^2}, c = \frac{\delta^2 U}{\delta_x \delta_y}, G_x = \frac{\delta^2 U}{\delta_x \delta_z}, G_y = \frac{\delta^2 U}{\delta_y \delta_z}$$

$b-a$ and $c$ are the horizontal direction forces, as Eötvös has termed them, and $G_x$ and $G_y$ are the components of the gradient of the gravity, this gradient meaning the increase of the earth acceleration $g$ when proceeding horizontally by 1 cm. The total gradient is the largest gradient, the azimuth $\lambda$ of which is given by the equation $tg\ 2\lambda = \frac{2c}{a-b}$. U denotes the force-function of the gravity. The quantities $a$, $b$ and $c$ stand in a distinct connection with the level surfaces of the gravity. As ball-shaped level surfaces, that is to say, gravity fields in which a torsion of the wire does not take place, are not available for the gauging, the zero position $n_o$ of the suspension members constitutes a fifth unknown quantity.

In the case of the Eötvös torsion scale of the first type the attraction masses $m$ are arranged in the same height, and the difference of height is zero, in consequence whereof the two last terms in the above equation can be left out, and it becomes:

$$\vartheta = \frac{n-n_o}{2D} = \frac{I}{2} \cdot \frac{K}{\tau}(b-a) \cdot \sin 2\alpha + \frac{K}{\tau} \cdot c \cdot \cos 2\alpha$$

in which there are the three unknown quantities $n_o$, $b-a$, and $c$. The practically important ascertainment of the horizontal gradient of the gravity by its components $G_x$ and $G_y$ and its azimuth $\lambda$ is, therefore, not possible with a torsion scale of the first type, but ascertaining the level surfaces can be effected.

The ascertainment of the five unknown quantities $n_o$, $b-a$, $c$, $G_x$, and $G_y$ requires the measurement of the deflecting angle $\theta$ in five different azimuths $\alpha$. By inserting the values $\alpha_1$ until $\alpha_5$, as well as the also measured values $\theta_1-\theta_5$, or the values $n_1-n_5$ respectively, there is, thus, obtained a system of five equations with five unknown quantities. As azimuths the values $\alpha_1=0$, $\alpha_2=60°$, $\alpha_3=120°$, $\alpha_4=180°$, and $\alpha_5=240°$ are chosen. When making use of a suspended counter-member, the deflections are measured, at the time being simultaneously in two azimuths turned relatively to each other by 180° so that the scale allows of six readings in three positions. In order to verify these readings, the measuring rule is in most cases repeated wholly or partially. As an hour elapses from one reading to the next until the suspended members have become calm and re-adjusted themselves, every station requires, without verifying measurements, three hours, and correspondingly more hours if verifying measurements are made. From the deflections measured the five unknown quantities $n_o$, $b-a$, $c$, $G_x$, and $G_y$ and the azimuth of the gradient, must then be computed.

The method according to this invention aims at shortening the observation time required for a station, as well as to render the circumstantial computation superfluous. The basic idea of the method consists in ascertaining the deflection of the suspended attraction members not only in five azimuths, but in all, and to render it possible to read directly the direction and the magnitude of the gradient from the numerical values and the graphic representation of the same after one preceding gauging of the scale. The horizontal directing forces obtained simultaneously with said readings are practically less important, and mentioned merely by way of completion.

With the known measuring method the turning from one azimuth into the next is effected by a driving mechanism designed according to a clock wheel-work, but uniformity of the rotatory motion is not aimed at. The length of time required for continuing the movement is one minute. The suspended members are strongly shaken during this time, and the next observation can take place only after they have become calm again. In contradistinction thereto, the scale, that is to say, the suspended members together with the casing is, according to this invention, rotated slowly, continually and perfectly uniformly and without any shaking, and the deflection of the suspended members in all azimuths is observed either occularly or photographically. Producing a rotary movement of that quality requires a high-grade precision wheel-work rotating with the utmost uniformity imaginable. As with the former method the running of the driving wheel-work need not be uniform, there sufficed wheel-works with flying-wing braking or friction braking, but as regards the present improved method the accuracy of the measurement depends first of all upon the degree of the uniformity of the rotary motion and upon the freeness from shakings, in that every acceleration or retardation entails lagging or leading of the suspended members relatively to the turning azimuth owing to the inertia of the rotating masses. For the rest, the rotation must take place so slowly that the suspended members have time enough to adjust the deflection pertaining to every azimuth. A difference of phase of the two directions of rotation, perhaps occurring, can be ascertained experimentally.

Also the photographic plate is moved forward uniformly either by the first-mentioned driving wheel-work or by a separate one; said plate may be replaced advantageously by a film strip or by a strip of photographic registering paper carried upon a drum. If the photographic registration commences simultaneously with the rotation of the scale, it may be employed also for registering the oscillations of the suspended members and, thus, rendering possible verifying them, as well as ascertaining the diminution of the amplitude, i. e. the damping and the attainment of the position of rest, whereby it is, furthermore, rendered possible to shorten the measuring procedure again materially.

As the manner of running of the driving wheel-work is known, it is an easy matter to read, firstly, the point of time pertaining to every point of the curve drawn by the ray of light, and secondly, to read on the curve itself, at a certain definite initial position of the scale, the appertaining azimuth, whereby it is rendered possible to read from the curve without any preliminary procedure the direction and the magnitude of the gradient.

Besides these advantages effecting the measurements by means of the new type of torsion-scale described and explained on the preceding pages presents the further advantage of a considerable increase of the accuracy, and reduction of the measuring time. The design of the scale is extraordinarily simplified in that the complicated current supplying wires and the switching procedures between the switching mechanism, the driving gear, the braking members, the illuminating means, and, finally the movements of the photographic paper boxes, are dispensed with.

The invention is illustrated in the annexed drawing, as applied to an Eötvös balance.

Fig. 1 is one constructional form of the invention in a vertical section, while Fig. 2 shows diagrammatically an alternative construction.

Upon the pedestal 1 (Fig. 1) is rotatably mounted on cone 2 the scale housing 3, within which is suspended by the platinum-iridium filament 4, the scale beam 5 with the two weights 6 and 7. The cone 2 is journalled in the bearing 8. The filament is suspended from the head 9 which can be shifted relative to the casing 4 so as to adjust the relative position of the filament. The drive (clockwork) 10 is shown driving the casing through bevel-gears 11, 12. At the lower end of the filament is fixed the mirror 13. The rays from lamp 14 pass through the diaphragm 15 onto the mirror and are reflected thereby onto the photo plate 16, registering thereon the angular deflection of the hanging. The photo plate is suspended by means of thread 17 from a drum 18 which is slowly rotated by a clockwork for advancing the photo plate.

It is immaterial whether the apparatus is as described, or whether the casing 3 remains stationary.

A modified form of the invention of this latter type is illustrated in Fig. 2 in which $a$ represents a cylindrical casing with a tube $b$ extending upwards from the top. At the top of the tube there is a clockwork $c$, with a spindle $d$ which rotates slowly and uniformly, and from which is suspended the torsion filament $h$, carrying the beam $i$. I may provide suitable means for photographically or otherwise indicating or recording the rotation of the beam on a sheet or film. Alternatively I may provide a pointer $g$ suspended by means of two filaments $e$ and $f$, which revolve together with the spindle $d$. Retardation or acceleration of the beam $i$ is then apparent from comparison of the positions of the beam and pointer.

The two weights $i'$ and $i''$ carried by the beam are at different levels, and so are subject to different gravitational forces.

I may form the pointer as a casing protecting the whole gravitational hanging or hangings from air currents in the outer casing $a$.

It will of course be understood that the principle is the same if the entire casing $a$ is rotated with a spindle or head and the torsion filament, in which event, of course, the pointer $g$ may be dispensed with and the casing will serve as the pointer or indicating member.

What I claim as my invention and desire to secure by Letters Patent of the United States is:—

1. A torsion balance of the character described embodying a frame or casing, a torsion filament arranged within said casing, a balance beam suspended from said filament, weights attached to said beam and a driving means for producing continuous relative rotation between the said frame or casing and the torsion filament at a uniformly regular and constant rate of speed during the entire measuring operation.

2. A torsion balance of the character described embodying a frame or casing, a torsion filament arranged within said casing, one of said elements being rotatable, means for continuously driving said rotatable element at a uniformly regular and constant rate of speed during the entire measuring operation, a balance beam suspended from said filament and weights attached to said beam.

3. A torsion balance of the character described embodying a torsion filament, a balance beam suspended from said filament, weights attached to said beam and a driving means operative to continuously rotate the upper end of the torsion filament at a uniformly regular and constant rate of speed during the entire measuring operation.

4. The combination in a torsion balance for gravitational measurements, of a suspension supporting element, a suspension element, a driving means for producing continuous relative rotation between said elements during the entire measuring operation at a uniformly regular and constant rate of speed in a homogeneous gravitational field, and whereby said elements are adapted to be relatively influenced by forces in a non-homogeneous field so as to cause retardation or acceleration of such relative rotary motion and angular speed deflection of the suspension element relative to the suspension supporting element, and means for measuring the degree of such angular speed deflection.

5. A torsion balance comprising an indicating member, a suspension, and driving means for the indicating member and suspension, operative for continuously rotating both said indicating member and the suspension bodily during the entire measuring operation at a substantially uniformly regular and invariable rate of speed in a homogeneous gravitational field, and for maintaining the same velocity of speed rotation of the indicating member and the upper end of the suspension in a non-homogeneous gravitational field, the lower end of the suspension being susceptible to speed acceleration or retardation with respect to the speed of its upper end and that of the indicating member under the influence of gravitational disturbances, thereby producing under such disturbances comparable variations in the angular speed velocities of the unaffected and affected moving parts determining the value and direction of the disturbance.

6. The method of making gravitational measurements, which consists in continuously rotating a suspended torsion filament together with a balance beam suspended therefrom and its weights attached to said balance beam and an index member during the entire measuring operation at a rate of speed which is constant and invariable bodily with respect to both the filament and index member in a homogeneous gravitational field and relatively maintained with relation to the index member and the upper end of the torsion filament in a non-gravitational field while permitting the lower end of the filament to vary its angular speed with relation to the index member under the influence of a gravitational disturbance, and then determining the extent of such angular speed variation.

7. A torsion balance of the character described including a rotary suspension, a driving means for rotating the suspension continuously and at a uniformly regular and constant rate of speed, and an indicator operating continuously in the rotation of the suspension.

8. A torsion balance as claimed in claim 3, having a pointer to which rotation is imparted at the same rate as to the upper end of the filament of the suspension.

9. A torsion balance as claimed in claim 3 having a pointer to which rotation is imparted at the same rate as to the upper end of the filament, said pointer being suspended by means of a tube surrounding the torsion filament.

10. The method of making gravity measurements according to the Eötvös method, consisting in turning a torsion balance continually and uniformly about a vertical axis with very low speed, and making during the same time an observation in as many azimuths as desired.

11. The method of making gravity measurements according to the Eötvös method, consisting in turning a torsion balance continually and uniformly about a vertical axis with very low speed, and making during the same time an observation in all azimuths.

In witness whereof I have signed this specification.

KARL KILCHLING.